US007249196B1

(12) United States Patent
Peiffer et al.

(10) Patent No.: US 7,249,196 B1

(45) Date of Patent: Jul. 24, 2007

(54) WEB PAGE SOURCE FILE TRANSFER SYSTEM AND METHOD

(75) Inventors: Christopher Peiffer, Menlo Park, CA (US); Israel L'Heureux, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 459 days.

(21) Appl. No.: 09/680,998

(22) Filed: Oct. 6, 2000

(51) Int. Cl.
*G06F 15/16* (2006.01)

(52) U.S. Cl. ...................... 709/246; 709/203; 709/217; 709/232

(58) Field of Classification Search ................ 709/246, 709/203, 217, 219, 226, 227, 201, 247, 232, 709/238; 707/104.1; 715/513, 515; 345/473
See application file for complete search history.

(56) References Cited

U.S. PATENT DOCUMENTS 5,727,159 A * 3/1998 Kikinis ....................... 709/246
5,864,366 A 1/1999 Yeo
5,918,013 A * 6/1999 Mighdoll et al. ........... 709/217
6,029,182 A 2/2000 Nehab et al.
6,031,989 A * 2/2000 Cordell ....................... 715/515
6,049,342 A * 4/2000 Nielsen et al. .............. 345/473
6,049,821 A * 4/2000 Theriault et al. ........... 709/246
6,058,428 A 5/2000 Wang et al.
6,081,835 A * 6/2000 Antcliff et al. ............. 709/217
6,092,099 A 7/2000 Irie et al.
6,122,666 A * 9/2000 Beurket et al. ............. 709/226
6,128,655 A 10/2000 Fields et al.
6,157,924 A * 12/2000 Austin ......................... 707/10
6,247,048 B1 * 6/2001 Greer et al. ................ 709/219
6,266,369 B1 7/2001 Wang et al.
6,275,301 B1 8/2001 Bobrow et al.
6,275,829 B1 * 8/2001 Angiulo et al. .......... 707/104.1

(Continued)

FOREIGN PATENT DOCUMENTS

| | | |
|---|---|---|
| EP | 0811939 | 12/1997 |
| EP | 0994426 | 4/2000 |
| JP | 10-224523 | 8/1998 |
| JP | 10-254888 | 9/1998 |
| JP | 10-285502 | 10/1998 |
| JP | 10-301943 | 11/1998 |
| WO | WO 00/68832 | 11/2000 |
| WO | WO 01/27711 | 4/2001 |

OTHER PUBLICATIONS

Mohan R., Smith J.R., Content Adaptation Framework, IEEE: Global Telecommunications Network, 1999, vol. 4 pp. 2015-2021.*

(Continued)

*Primary Examiner*—Yves Dalencourt
*Assistant Examiner*—Ramy M Osman
(74) *Attorney, Agent, or Firm*—Shumaker & Sieffert, P.A.

(57) ABSTRACT

A method for transmitting web page source data over a computer network. The method typically includes receiving a request for the web page source data from a remote client. The web page source data contains renderable and non-renderable data. The request is received at an acceleration device positioned on the computer network intermediate the web page source data and an associated web server. The method further includes filtering at least a portion of the non-renderable data from the requested web page source data, thereby creating modified web page source data, and sending the modified web page source data to the remote client. The non-renderable data is selected from the group consisting of whitespace, comments, hard returns, meta tags, keywords configured to be interpreted by a search engine, and commands not interpretable by the remote client.

39 Claims, 15 Drawing Sheets

U.S. PATENT DOCUMENTS

| | | | | |
|---|---|---|---|---|
| 6,300,959 | B1 * | 10/2001 | Gabler et al. | 345/473 |
| 6,304,676 | B1 | 10/2001 | Mathews | |
| 6,311,223 | B1 * | 10/2001 | Bodin et al. | 709/247 |
| 6,317,790 | B1 * | 11/2001 | Bowker et al. | 709/225 |
| 6,332,131 | B1 * | 12/2001 | Grandcolas et al. | 705/35 |
| 6,345,279 | B1 * | 2/2002 | Li et al. | 709/217 |
| 6,405,222 | B1 | 6/2002 | Kunzinger et al. | |
| 6,424,981 | B1 * | 7/2002 | Isaac et al. | 715/513 |
| 6,438,125 | B1 * | 8/2002 | Brothers | 709/219 |
| 6,449,658 | B1 * | 9/2002 | Lafe et al. | 709/247 |
| 6,535,896 | B2 * | 3/2003 | Britton et al. | 715/513 |
| 6,546,388 | B1 * | 4/2003 | Edlund et al. | 707/5 |
| 6,557,005 | B1 * | 4/2003 | Burget | 709/217 |
| 6,563,517 | B1 * | 5/2003 | Bhagwat et al. | 345/743 |
| 6,578,073 | B1 * | 6/2003 | Starnes et al. | 709/219 |
| 6,601,108 | B1 * | 7/2003 | Marmor | 709/246 |
| 6,615,266 | B1 * | 9/2003 | Hoffman et al. | 709/227 |
| 6,631,298 | B1 | 10/2003 | Pagnano et al. | |
| 6,728,785 | B1 * | 4/2004 | Jungck | 709/247 |
| 6,742,043 | B1 | 5/2004 | Moussa et al. | |
| 6,834,297 | B1 * | 12/2004 | Peiffer et al. | 709/247 |
| 6,925,595 | B1 * | 8/2005 | Whitledge et al. | 709/217 |
| 6,993,476 | B1 | 1/2006 | Dutta et al. | |
| 2002/0078164 | A1 | 6/2002 | Reinschmidt | |
| 2002/0112078 | A1 | 8/2002 | Yach | |
| 2003/0069927 | A1 | 4/2003 | Malmskog | |
| 2005/0080876 | A1 * | 4/2005 | Peiffer et al. | 709/217 |

OTHER PUBLICATIONS

Bharadvaj H., Joshi A., An Active Transcoding Proxy to Support Mobile Web Access, IEEE Symposium: Reliable Distributed Systems, Oct. 1998, pp. 118-123.*

Spyglass, Inc. , http://www.spyglass.com , http://webarchive.org/web/19990429034543/http://www.spyglass.com , Apr. 29, 1999.*

Office action in U.S. Appl. No. 09/680,997, issued Nov. 10, 2003.

Office action in U.S. Appl. No. 09/680,675, issued Dec. 18, 2003.

International Search Report, PCT/US01/41953, issued Dec. 13, 2001.

International Search Report, PCT/US01/27164, issued Oct. 31, 2001.

International Search Report, PCT/US01/42476, issued Nov. 19, 2001.

Mohan R., Smith J.R., Content Adaptation Framework, IEEE; Global Telecommunications Network, 1999, vol. 4. pp. 2015-2021.

Bharadvaj H., Joshi A., An Active Transcoding Proxy to Support Mobile Web Access, IEEE Symposium; Reliable Distributed Systems, Oct. 1998, pp. 118-123.

Spyglass, Inc., http://www.spyglass.com, http://webarchive.org/web/19990429034543/http://www.spyglass.com, Apr. 29, 1999.

Johnson, "Converting PC GUIs for NonPC Devices," *Circuit Cellar Ink*, Vernon, CT, US, pp. 40-42 and 44, vol. 91, Feb. 1998.

Fox et al., "Reducing WWW Latency and Bandwidth Requirements by Real-Time Distillation," *Computer Networks and ISDN Systems*, North Holland Publishing, Amsterdam, NL, pp. 1445-1456, vol. 28, No. 11, May 1996.

"eekim.com", CGI Programming Slides, 1996.

U.S. Appl. No. 10/996,871, entitled "Rule-Based Networking Device," filed Nov. 23, 2004.

U.S. Appl. No. 11/226,917, entitled "Rewriting Cookies With A Rule-Based Networking Device," filed Sep. 14, 2005.

* cited by examiner

ORIGINAL WEB PAGE SOURCE DATA

```
<HTML>
    <HEAD>
        <TITLE>Sample Page</TITLE>
        <META NAME="Author" CONTENT="Keyword1 Keyword2 Keyword3">
    </HEAD>
    <!--Comments: This is a sample web page containing text and images.-->
    <BODY>
        <!--Comments: The following image is served by a remote server. The image is
        embedded in a hyperlink that leads to related information on the remote server.-->
        <CENTER>
            <a href="www.redlinenetworksremoteserver.com/sampleimages/information.html">
            </a>
        </CENTER>
        <H1 ALIGN=center>Sample Web Page</H1>
        <IMG SRC="www.redlinenetworks.com/images/OriginalImage.gif" ALIGN=left>

        Text Text Text Text Text Text Text Text Text Text Text Text Text Text Text
        Text Text Text Text Text Text Text Text Text Text Text Text Text Text Text
        Text Text Text Text Text Text Text Text Text Text Text Text Text Text Text
        Text Text Text Text Text Text Text Text Text Text Text Text Text Text Text

    </BODY>
</HTML>
```

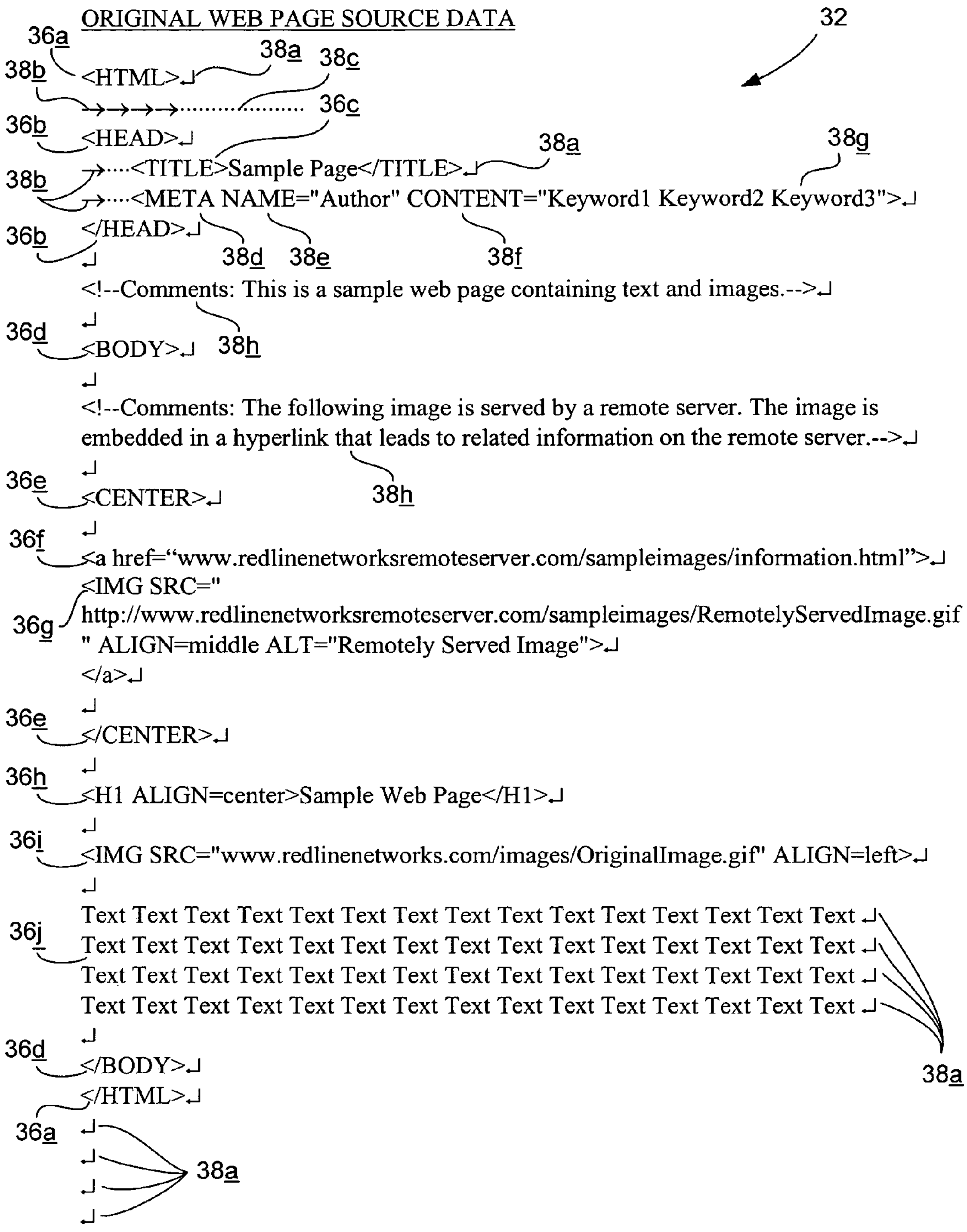

FILTERED WEB PAGE SOURCE DATA WITH LINK TO SMALLER VERSION OF IMAGE

<html><head><title>Sample Page</title><meta name="Author" content="Keyword1 Keyword2 Keyword3"></head><body><center><a href="http://www.redlinenetworksremoteserver.com/sampleimages/information.html"> <img src=" http://www.redlinenetworksremoteserver.com/sampleimages/RemotelyServedImage.gif" align=middle alt="Remotely Served Image"></a></center><h1 align=center>Sample Web Page</h1><img src="www.redlinenetworks.com/images/OriginalImage.gif?THIN" align=left> Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text </body></html>

FILTERED WEB PAGE SOURCE DATA WITH LINK TO ORIGINAL VERSION OF IMAGE

<html><head><title>Sample Page</title><meta name="Author" content="Keyword1 Keyword2 Keyword3"></head><body><center><a href="http://www.redlinenetworksremoteserver.com/sampleimages/information.html"> <img src=" http://www.redlinenetworksremoteserver.com/sampleimages/RemotelyServedImage.gif" align=middle alt="Remotely Served Image"></a></center><h1 align=center>Sample Web Page</h1><img src="www.redlinenetworks.com/images/OriginalImage.gif?FAT" align=left> Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text Text </body></html>

WEB PAGE SOURCE FILE TRANSFER SYSTEM AND METHOD

CROSS REFERENCE TO RELATED APPLICATIONS

This application is related to U.S. patent application Ser. No. 09/680,675, entitled NETWORK DATA TRANSFER ACCELERATION SYSTEM AND METHOD, filed Oct. 6, 2000 by, inventors. Christopher Peiffer and Israel L'Heureux, and also to U.S. patent application Ser. No. 09/680,997, entitled IMAGE TRANSFER SYSTEM AND METHOD, also filed on Oct. 6, 2000 by inventors Christopher Peiffer and Israel L'Heureux.

TECHNICAL FIELD

The present invention relates generally to data transmission on computer networks, and more particularly to acceleration of transmission of a web resource over a computer network.

BACKGROUND OF THE INVENTION

The Internet has experienced explosive growth in recent years. The emergence of the World Wide Web has enabled millions of users around the world to download easily web pages containing text, graphics, video, and sound data while at home, work, or from remote locations via wireless devices. These web pages often are large in size and therefore require a long time to download, causing the user delay and frustration. Delay often causes users to abandon the requested web page and move on to another web page, resulting in lost revenue and exposure for many commercial web sites.

Delay downloading a web page can be caused by a number of factors. At the server, a large volume of page requests may overload the capacity of the server and result in unanswered or late-answered requests. Within the computer network, network congestion and limited bandwidth may cause delay in the transmission of data. Particularly problematic is the so-called "last mile" between many home users and their Internet Service Provider. For a majority of Internet users, the last mile is typically a telephone modem connection configured to operate at speeds at or lower than 56K baud. For these users, large web pages take an agonizingly long time to download.

It would be desirable to provide a system and method for accelerating data transmission over a computer network, in order to decrease delay and provide users with a more pleasurable experience.

SUMMARY OF THE INVENTION

A method for transmitting web page source data over a computer network is provided. The method typically includes receiving a request for the web page source data from a remote client. The web page source data contains renderable and non-renderable data. The request is received at an acceleration device positioned on the computer network intermediate the web page source data and an associated web server. The method further includes filtering at least a portion of the non-renderable data from the requested web page source data, thereby creating modified web page source data, and sending the modified web page source data to the remote client. The non-renderable data is selected from the group consisting of whitespace, comments, hard returns, meta tags, keywords configured to be interpreted by a search engine, and commands not interpretable by the remote client.

BRIEF DESCRIPTION OF THE DRAWINGS

FIG. 17 is a listing of original web page source data.

FIG. 18 is a listing of filtered web page source data including a hyperlink to a smaller version of an inline image, filtered according to one embodiment of the present invention.

FIG. 19 is a listing of the filtered web page source data of FIG. 18, rewritten to include a hyperlink to an original version of the inline image.

DETAILED DESCRIPTION OF THE INVENTION

Figure 1:
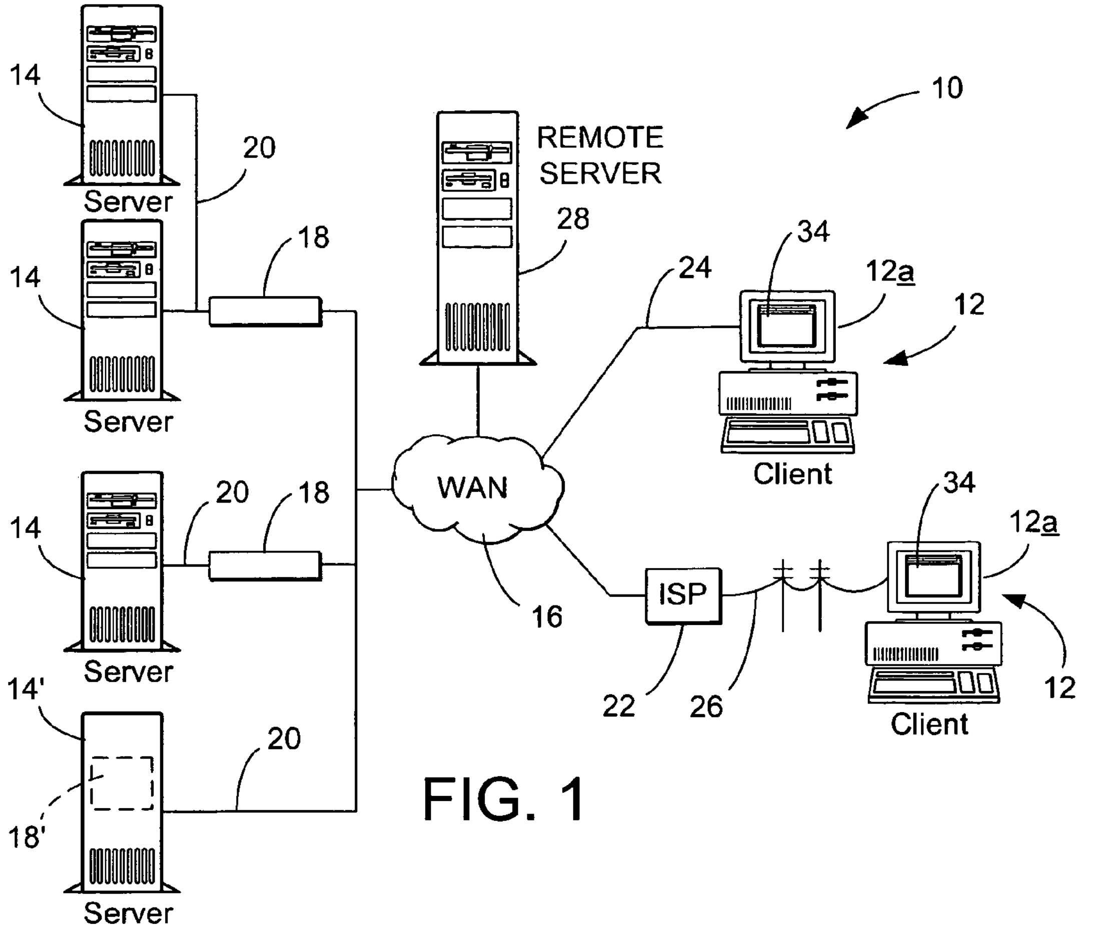
FIG. 1 is a schematic view of a network data acceleration system according to one embodiment of the present invention.

Referring initially to FIG. 1, a computer networking system according to one embodiment of the present invention is shown generally at 10. System 10 typically includes a plurality of remote clients 12 configured to download data from servers 14 via computer network 16. Remote clients 12 are typically computing devices, such as personal computers (PCs), portable data assistants (PDAs), web-enabled wireless telephones, mainframe computers, etc.

System 10 further includes an acceleration device 18 positioned intermediate each of remote clients 12 and servers 14. Acceleration device 18 is configured to accelerate the transmission of data between the server 14 and remote client 12. Acceleration device 18 is alternatively referred to herein as networking device 18.

Typically, acceleration devices 18 are stand-alone appliances linked to computer network 16. According to an alternative embodiment of the invention, system 10 may include an acceleration device 18' integrated into server 14'. Acceleration devices 18 may be connected to servers 14 in a one-to-one relationship, or in a one-to-many relationship, as shown. When one acceleration device 18 is linked to several servers 14, it functions to distribute requests from remote clients 12 to the many servers 14, thereby approximately balancing the load placed on each of the servers.

Typically, acceleration devices 18 are connected to servers 14 via Local Area Networks (LANs) 20, and are connected to remote clients 12 via computer network 16, which is typically a Wide Area Network 16, such as the Internet. Remote clients 12 may be connected to WAN 16 directly via a broadband connection 24, or via an Internet Service Provider (ISP) 22. Typically, remote client 12 and ISP 22 are linked via a modem connection through the Public Switched Telephone Network (PSTN) 26. A typical operating speed for the PSTN modem connection 26 is approximately 56K bits per second (bps) or less, while a typical operating speed for direct broadband connection 24 is between about 256K bps to 10 Megabits per second, and may be higher.

Figure 15:
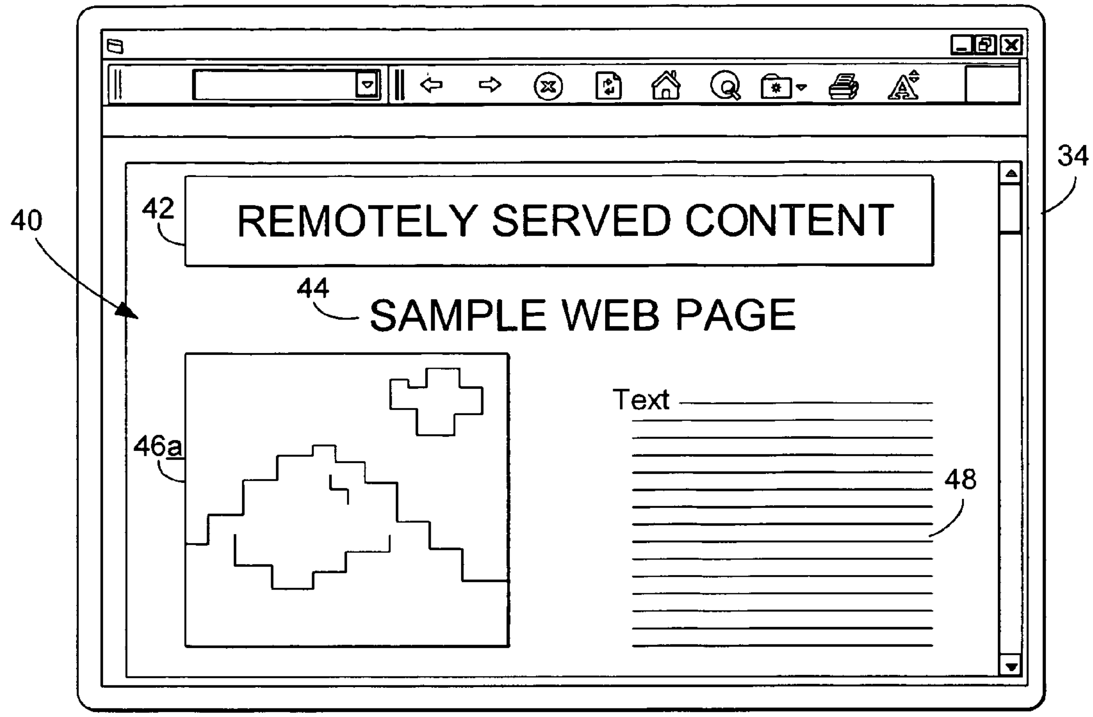
FIG. 15 is a web page according to one embodiment of the present invention, shown with a smaller version of the image data.
Figure 16:
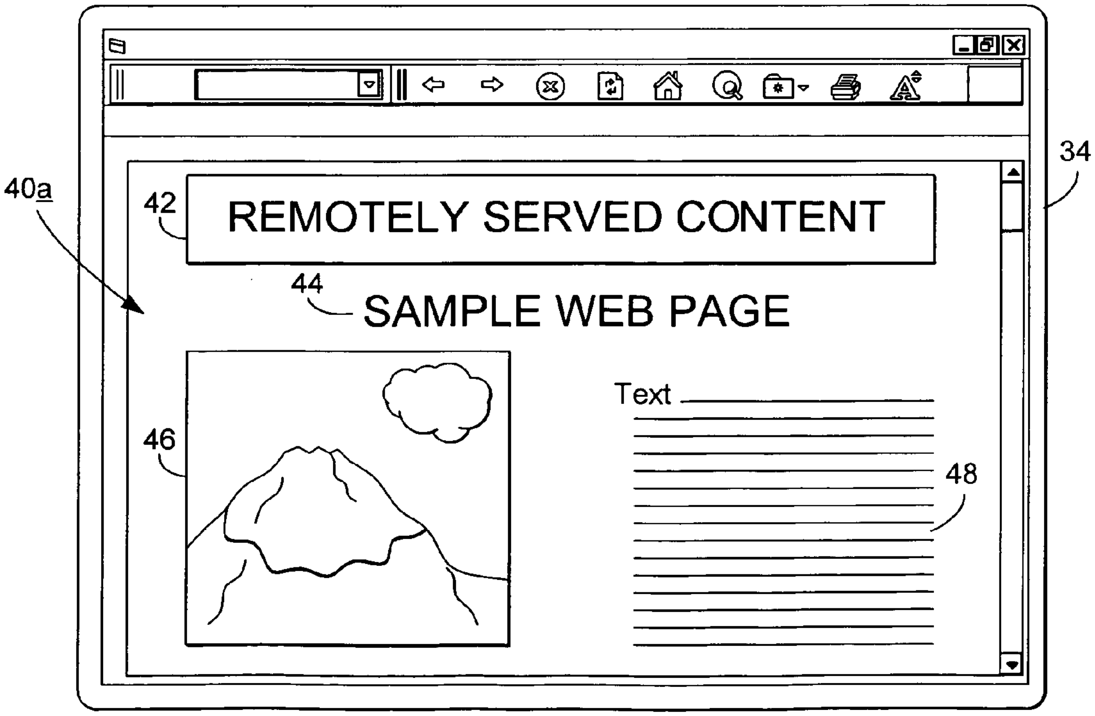
FIG. 16 is the web page of FIG. 15, shown with an original, unmodified version of the image data of FIG. 15.

A remote server 28 may be provided to serve additional data to remote clients 12 via computer network 16. This data is referred to herein as remotely served content, and in the case where web server 14 and remote server 28 are operated by different content providers, may be referred to herein as third-party content. Remotely served content is shown in FIGS. 15 and 16 at 42. Typically, remote server 28 is an advertising server 28 configured to serve an advertisement to remote client 12. In addition to advertising, it will be appreciated that the remotely served content may be virtually any other type of information, such as news, weather, stock quotes, etc., and may contain graphics, text, images, video, and/or sounds. The function of remote server 28 will be further described below.

Figure 14:
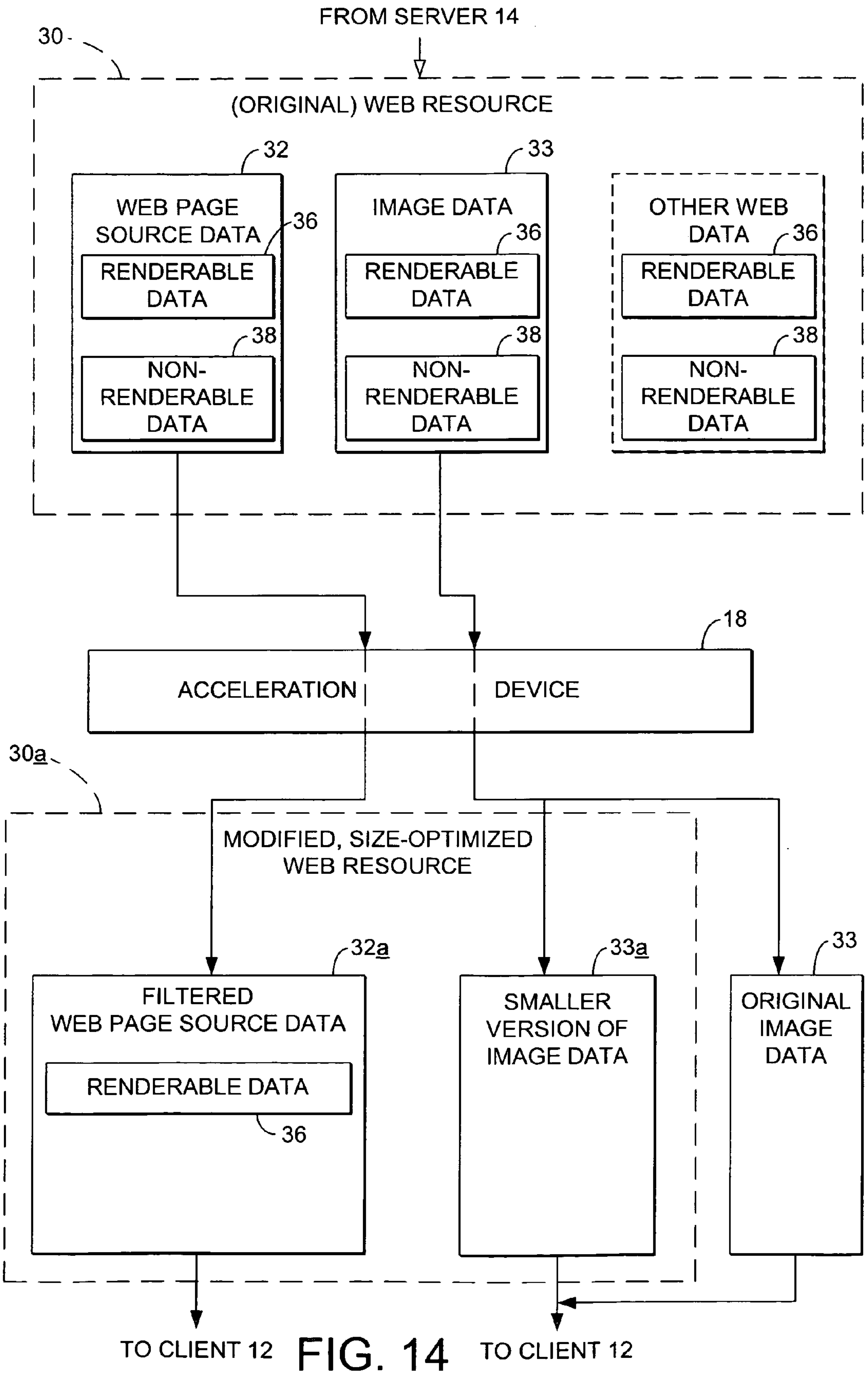
FIG. 14 is a schematic view of a data flow according to one embodiment of the present invention.

Servers 14, 28 typically are web servers 14, 28 configured to serve a web resource, shown at 30 in FIG. 14, to browser programs 34 executed on remote clients 12. Exemplary browser programs 34 include the Netscape browser commercially available from Netscape Communications Corporation of Santa Clara, Calif. and the Internet Explorer browser commercially available from Microsoft Corporation of Redmond, Wash. The web servers and browsers typically communicate using the HyperText Transfer Protocol (HTTP). The web resource may be web page source data 32, image data 33, sound data, video data, graphics data, embedded code such as a JavaScript applet, a stylesheet, or virtually any other resource accessible and interpretable by a browser via a Uniform Resource Indicator (URI).

Figure 2:
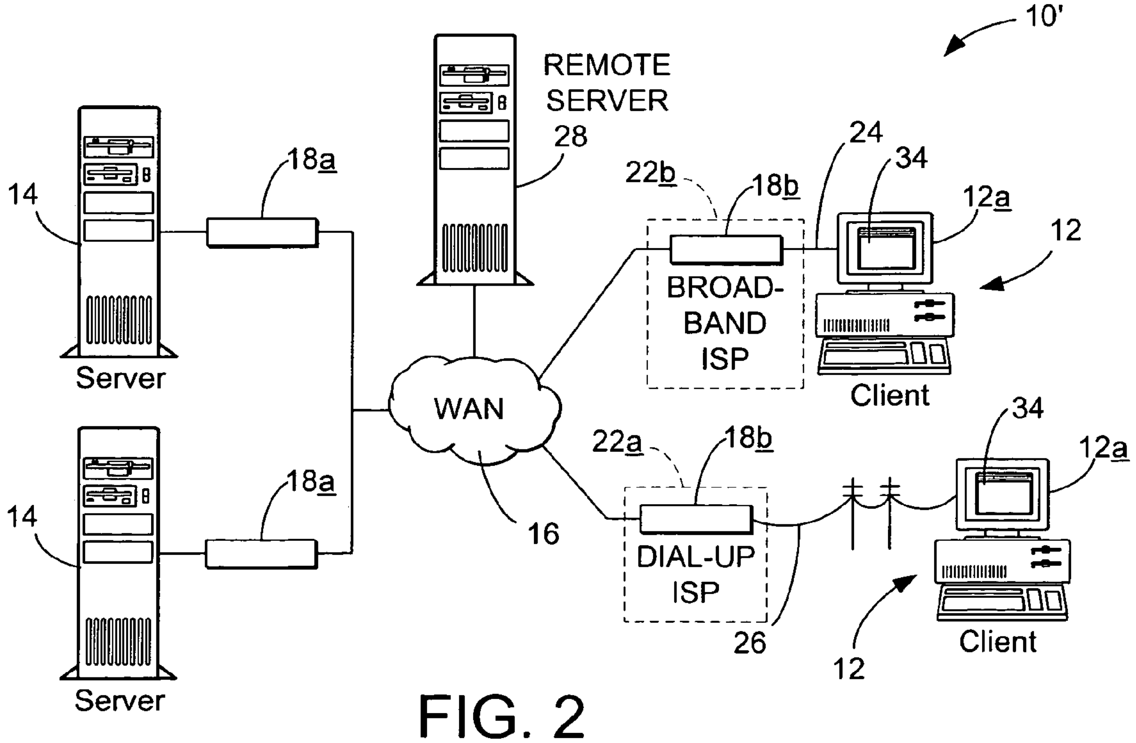
FIG. 2 is a schematic view of a network data acceleration system according to another embodiment of the present invention.

In FIG. 2, another embodiment of a computer networking system according to the present invention is shown at 10'. Computer networking system 10' typically includes server-side acceleration devices **18*a* positioned in the same location as described above for acceleration devices 18 of FIG. 1. Computer networking system 10' also typically includes remote client-side acceleration devices 18*b* positioned intermediate computer network 16 and a respective remote client 12. Typically, acceleration devices 18*b* are positioned at a dial-up ISP 22*a*, or at a broadband ISP 22*b***.

In the embodiment depicted in FIG. 2, acceleration devices **18*a* and 18*b* function in the manner described below, and also have the additional ability to communicate with each other using a binary protocol, thereby avoiding use of standard ASCII protocols such as HTTP, and decreasing the number of bits required for transmission of the web resource. In addition, acceleration devices 18*a* and 18*b* have the ability to establish an Internet Protocol (IP) level connection, and communicate in the binary protocol without using Transmission Control Protocol (TCP). TCP includes handshaking and other procedures that require valuable time and slow down the overall data transmission rate. Therefore, avoiding use of TCP effectively increases the rate at which data is transferred. Finally, the acceleration devices 18*a* and 18*b*** have the ability to establish persistent connections with each other. Persistent connections are network connections on sockets that are always kept open once they are established. By keeping a connection open, the acceleration devices avoid repeating tasks associated with the opening and closing of sockets, thereby saving valuable time and increasing the overall data transmission rate.

Turning to FIG. 14, web resource 30 typically includes web page source data 32 and associated image data 33. Web resource 30 may also include other types of files such as video files, sound files, graphic animation files, embedded code files such as JavaScript applets, cascading stylesheets (CSS), etc. Web page source data 32 typically is encoded using a markup language such as the HyperText Markup Language (HTML), while image data 34 typically is encoded in a standard image format such as the JPEG, GIF, or animated GIF image formats. It will be appreciated that other suitable file formats may be used for the web page source data and the image data.

Web page source data 32 includes renderable data 36 and non-renderable data 38. Renderable data 36 is data that browser 34 is configured to interpret when rendering a web page 40 using web resource 30. That is, renderable data 36 is data that affects the manner in which browser 34 presents the visual and aural content and layout of web page 40, as well as the interactive functions of web page 40. Renderable data 36 includes, but is not limited to, text, images, layout and formatting instructions, background color, hyperlinks, graphic animations, sounds, etc.

Non-renderable data 38 is data that is not interpreted by browser 34 in a manner that affects the visual or aural content or layout of web page 40, nor the interactive function of web page 40. For example, whitespace, hard returns, comments, meta tags, keywords, etc. are examples of non-renderable data. Non-renderable data 38 also includes formatting instructions, such as HTML tags, which browser 34 on remote client 12 is not configured to interpret. Image data 33 may also contain non-renderable data such as author, title, comments, and creation date data.

As will be discussed in detail below, acceleration device 18 typically is configured to accelerate transmission of web resource 30 from server 14 to remote client 12 by processing web resource 30 to form a modified, size-optimized version of the web resource **30*a*. Size-optimized version 30*a* is smaller in file size than original web resource 30, and therefore takes less time to transfer via computer network 16**.

Where web resource 30 includes web page source data 32, size-optimized version **30*a* of the original web resource 30 typically includes filtered web page source data 32*a*, produced by filtering at least a portion of non-renderable data 38** from original web page source data 32. Where web resource 30 includes image data 33, the size-optimized version 30*a* of the original data may include a smaller version of the image data 33*a*, produced by altering an image parameter of the image data and/or modifying the format of the image data, as described below.

Turning now to FIGS. 15 and 16, a web page rendered by browser 34 based on web resource 30 is shown at 40. Web page 40 typically includes remotely served content 42, served by remote server 28, as well as heading 44, inline image 46, and text 48. The text and formatting of web page 40 are determined by formatting instructions, also referred to as tags, and text data contained within web page source data 32. It will be understood that the ultimate visual and aural presentation of the web page 40 typically is not altered by filtering all or a portion of non-renderable data 38 from web page source data 32 by acceleration device 18.

Web page source data 32 contains a hyperlink, shown at 36*g* in FIG. 17, to remote server 28 for remotely served content 42. Hyperlink 36*g* typically includes a uniform resource locator (URL), and instructs browser 34 to request the image data for the remotely served content from remote server 28. Web page source data 32 also contains a hyperlink, shown at 36*i* in FIG. 17 and at 36*k* in FIG. 18, to inline image 46. Hyperlink 36*i* instructs browser 34 to request image data 33 corresponding to inline image 46 from web server 14.

As will be described below, according to one embodiment of the present invention, upon request by the browser for the image data, the acceleration device is configured to send a smaller version of the image data 33*a*, which is presented as size-optimized inline image 46*a*. After size-optimized inline image 46*a* is displayed, the web server typically instructs browser 34 to request an original, unmodified version of image data 33. The original version of image data 33 is ultimately displayed as original, unmodified inline image 46 via browser 34. Typically, the web server instructs the browser to download the original version of image data 33 by embedding a script (typically JavaScript) or other executable code in web page source data 32 for web page 40. This script is configured to rewrite the web page in the browser memory, such that the link 36*k* that was used to point to the smaller version of the image data 33*a*, is replaced with a link 36*m* that points to an original version of the image data 33.

To access web page 40, a user of remote client 12 typically establishes a connection to computer network 16 via ISP 22, and enters a Uniform Resource Locator (URL) of a desired web page 40 served by web server 14 into browser 34. Browser 34 typically sends a request to the web server 14 to serve the desired web page. Typically, acceleration device 18 is located at the IP address contained within the URL for the web server. Acceleration device 18 is configured to receive and process the request sent to web server 14, to accelerate the transmission of web resource 30 from web server 14 to remote client 12, as described below.

Figure 3:
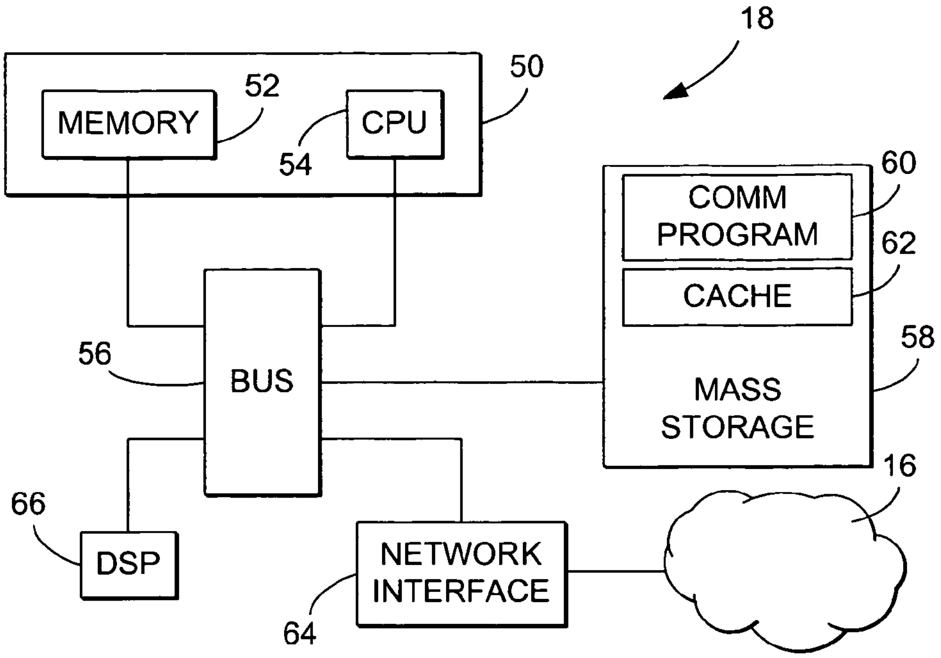
FIG. 3 is a schematic view of a network data acceleration device according to one embodiment of the present invention.

As shown in FIG. 3, acceleration device 18 includes a controller 50 having a memory 52 and central processing unit (CPU) 54 linked by a bus 56. Acceleration device 18 also typically includes a mass storage device 58 having a communications program 60 and cache 62. Communications program 60 is configured to process requests for web resource 30 from remote clients 12 according to the methods shown in FIGS. 6-13 and described below. Cache 62 is configured to store web resources 30, such as web page source data 32, filtered web page source data 32*a* and image data 33, 33*a*, previously requested by remote clients 12.

Acceleration device 18 also typically includes a network interface 64 coupled to bus 56 and to an external network connection to computer network 16. Network interface 64 is configured to enable acceleration device 18 to send and receive data via computer network 16. An example of a suitable network interface is the Intel Ethernet Pro 100 network card, commercially available from Intel Corporation of Hillsboro, Oreg. Acceleration device 18 also may include a digital signal processor (DSP) 66 configured to create a smaller version 33*a* of image data 33 in real-time, according to the methods described below in detail in FIGS. 10-12. Examples of commercially available DSPs suitable for use as DSP 66 are the Texas Instruments 6501/6503 digital signal processors, commercially available from Texas Instruments, Inc., of Dallas, Tex.

Figure 4:
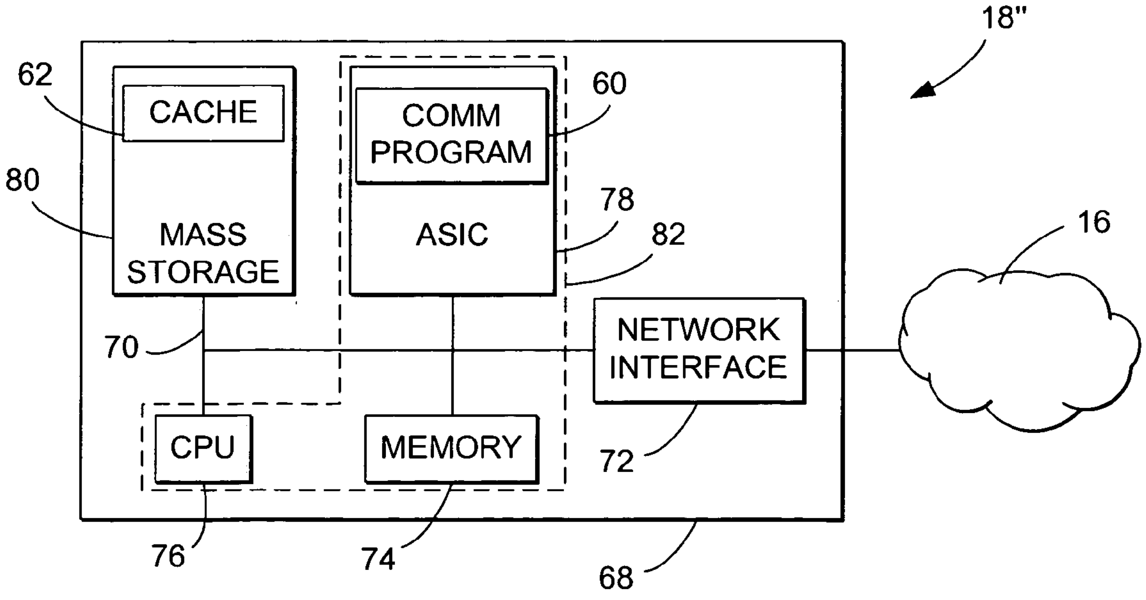
FIG. 4 is a schematic view of a network data acceleration device according to another embodiment of the present invention.
Figure 5:
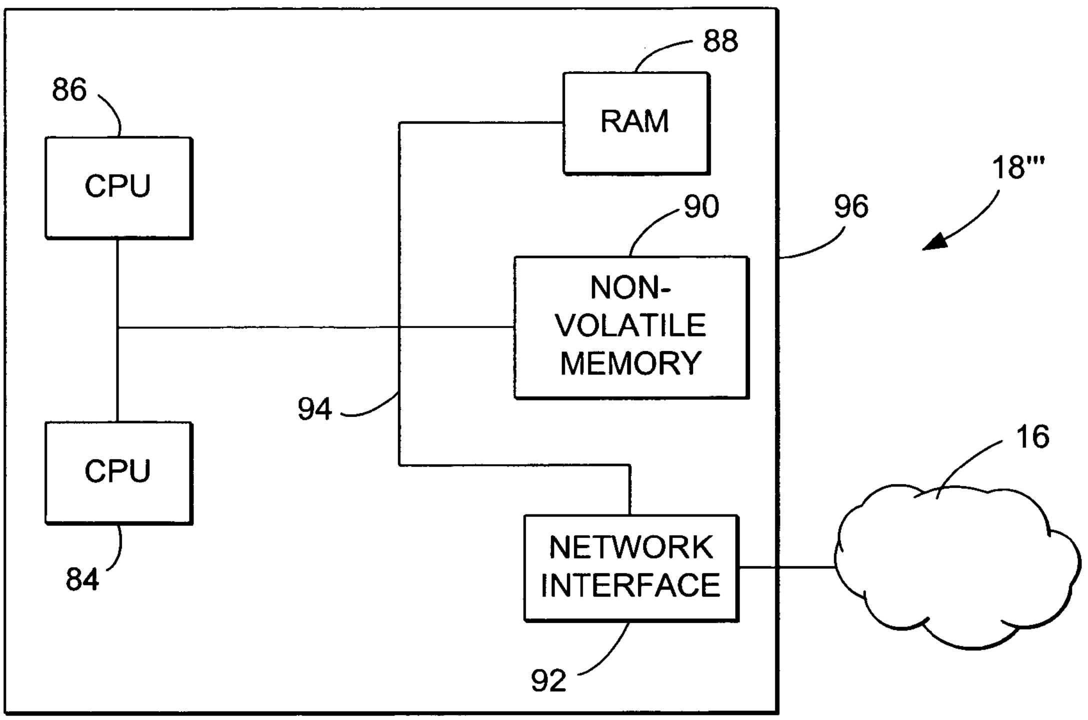
FIG. 5 is a schematic view of a network data acceleration device according to yet another embodiment of the present invention.

In FIG. 4, another embodiment of an acceleration device according to the present invention is shown generally at 18". Acceleration device 18" typically includes a single integrated circuit board 68. The integrated circuit board contains a bus 70 connecting a network interface 72, memory 74, CPU 76, Application Specific Integrated Circuit (ASIC) 78, and mass storage device 80. ASIC 78 typically contains the communication program 60, while mass storage device 80 typically contains the cache 62, described above. It will be appreciated that the embodiments of the acceleration device 18, 18" may be a stand-alone network appliance 18 or may be integrated with a web server 14', as shown at 18' in FIG. 1. ASIC 78, CPU 76, and memory 74 form a controller 82 configured to process requests for web resources according to the methods described below.

Figure 6:
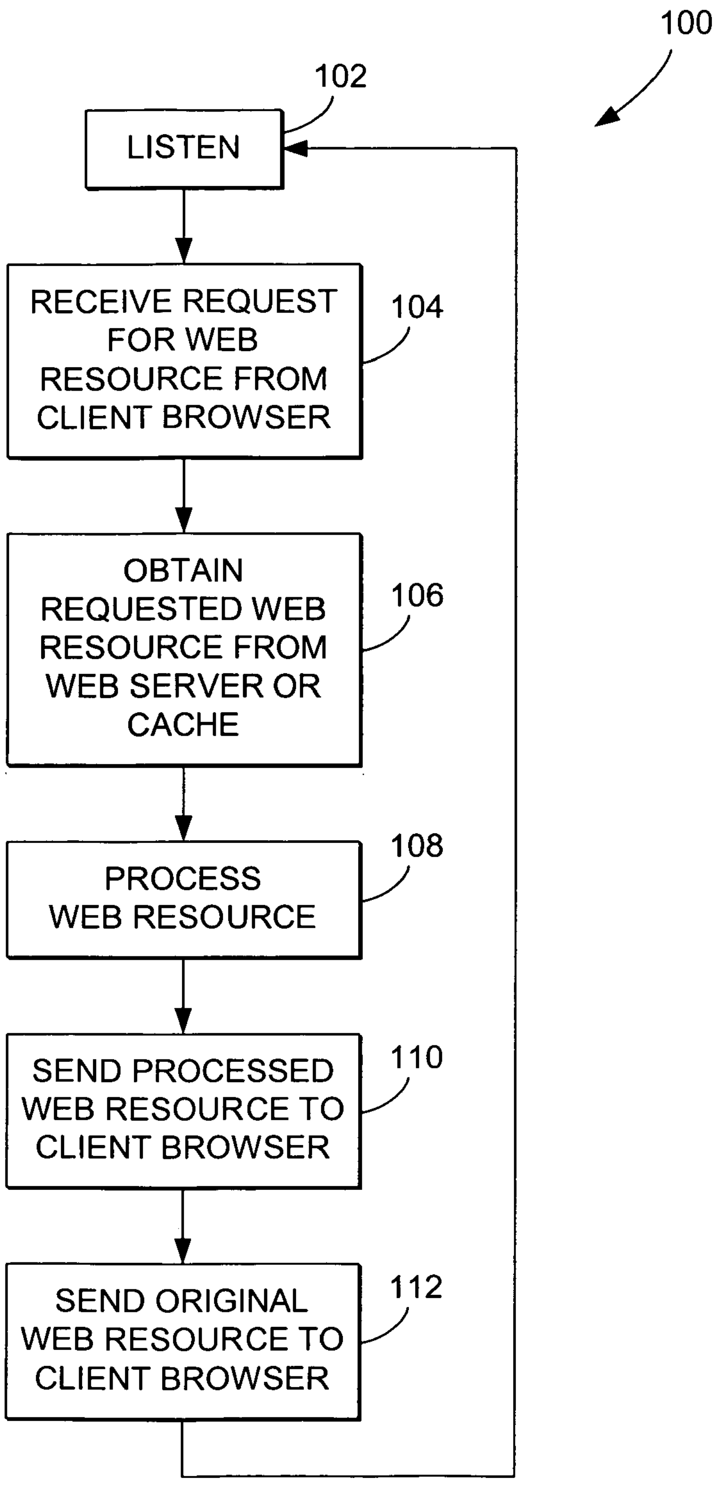
FIG. 6 is a flowchart of a method for computer networking according to one embodiment of the present invention.

In FIG. 6, yet another embodiment of an acceleration device according to the present invention is shown generally at 18'". Acceleration device 18'" typically includes a plurality of co-processing CPUs 84, 86 linked to each other and to RAM 88, non-volatile memory 90, and network interface 92 by a bus 94. Components 84-94 are typically mounted to a circuit board 96. Non-volatile memory is typically solid state memory such as flash memory or ROM, and contains communication program 60, described above. Ram 88 is available to CPUs 84, 86 for temporary storage of data when the CPUs are processing web requests according to the methods described below. Acceleration device 18'" typically does not include a mass storage device or cache, although alternatively a mass storage device and cache may be included. Components 84, 86, 88, and 90 form a controller configured to process requests for web resources according to the methods described below.

Turning now to FIG. 6, a method according to one embodiment of the present invention is shown generally at 100. Method 100 typically includes, at 102, listening at acceleration device 102 for a request for web resource 30. At 104, the method typically includes receiving a request for web resource 30 from remote client browser 12. Typically, the request is sent from remote client browser 12 to the IP address that the remote client browser associates with a web server 14, but which is actually assigned to an associated acceleration device 18. The request is typically received at acceleration device 18.

The method further includes at 106, obtaining original web resource corresponding to the requested web resource from web server 14. Typically, the original web resource is obtained by acceleration device 18. Alternatively, acceleration device 18 may determine that the requested web resource is cached, and may obtain the requested web resource from cache 62.

At 108, the method typically includes processing, at acceleration device 18, at least a portion of original web resource 30 to form size-optimized web resource 30*a* having a smaller file size than original web resource 30. Typically web resource 30 is processed based on its file type, according to the steps shown in FIGS. 7-8.

At 110, the method further includes, sending size-optimized web resource 30*a* to remote client 12. Typically size-optimized web resource 30*a* is sent from acceleration device 18 via computer network 16 to requesting remote client 12. The size-optimized web page is received by remote client 12 and is displayed on a display 12*a* associated with remote client 12.

At 112, the method further includes sending at least the portion of original web resource 30 that was size-optimized to the remote client in an original, unmodified state. Thus, method 100 may include sending from acceleration device 18 to remote client 12 all of original web resource 30 in an original unmodified state, or may include sending only a portion of original web resource 30 in an original unmodified state. According to one embodiment of the invention, web resource 30 may include web page source data 32 and image data 33, and the method at 112 may include sending only original image data 33 in an original, unmodified state.

Figure 7:
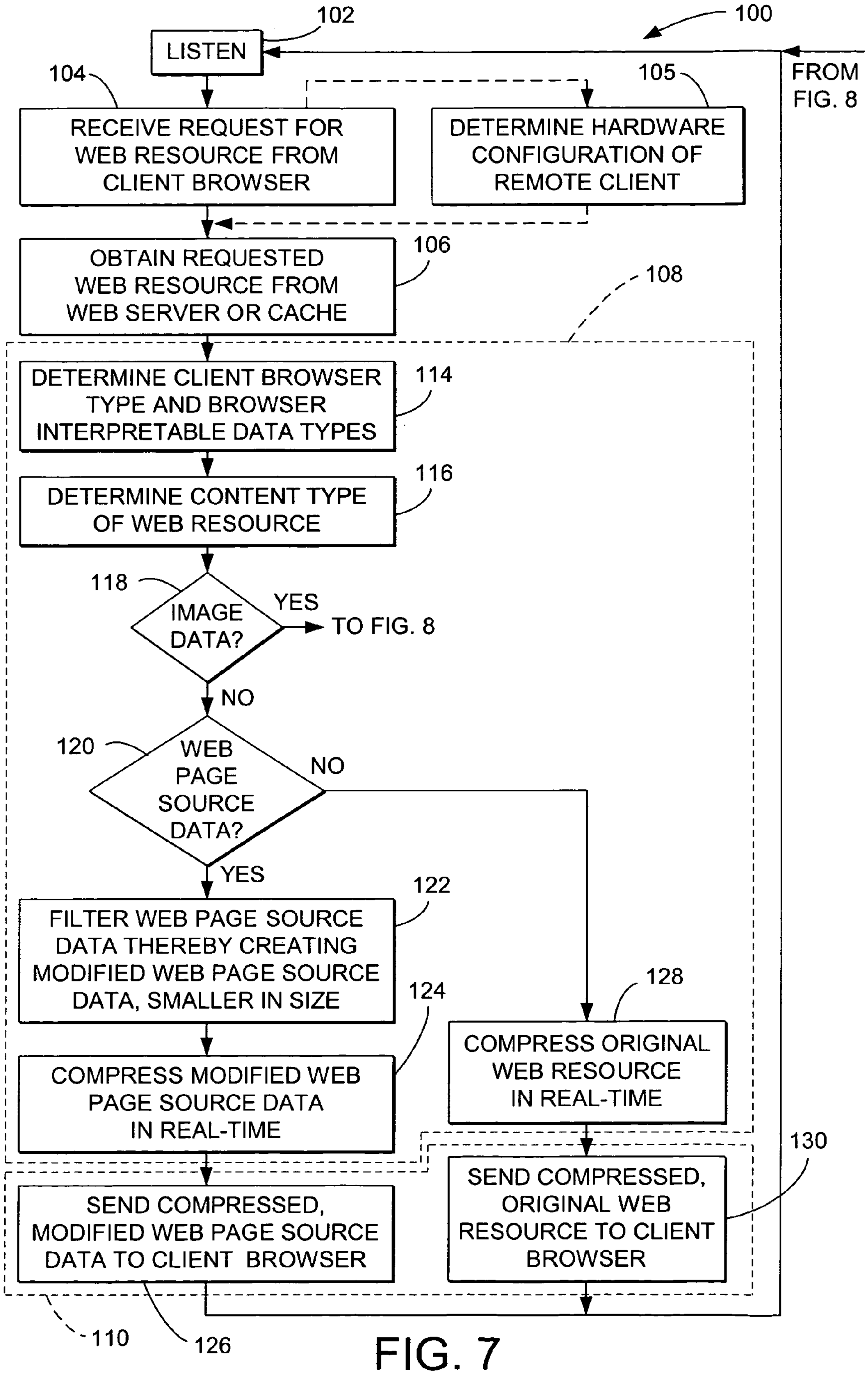
FIG. 7 is a flowchart of a method for computer networking according to another embodiment of the present invention.
Figure 8:
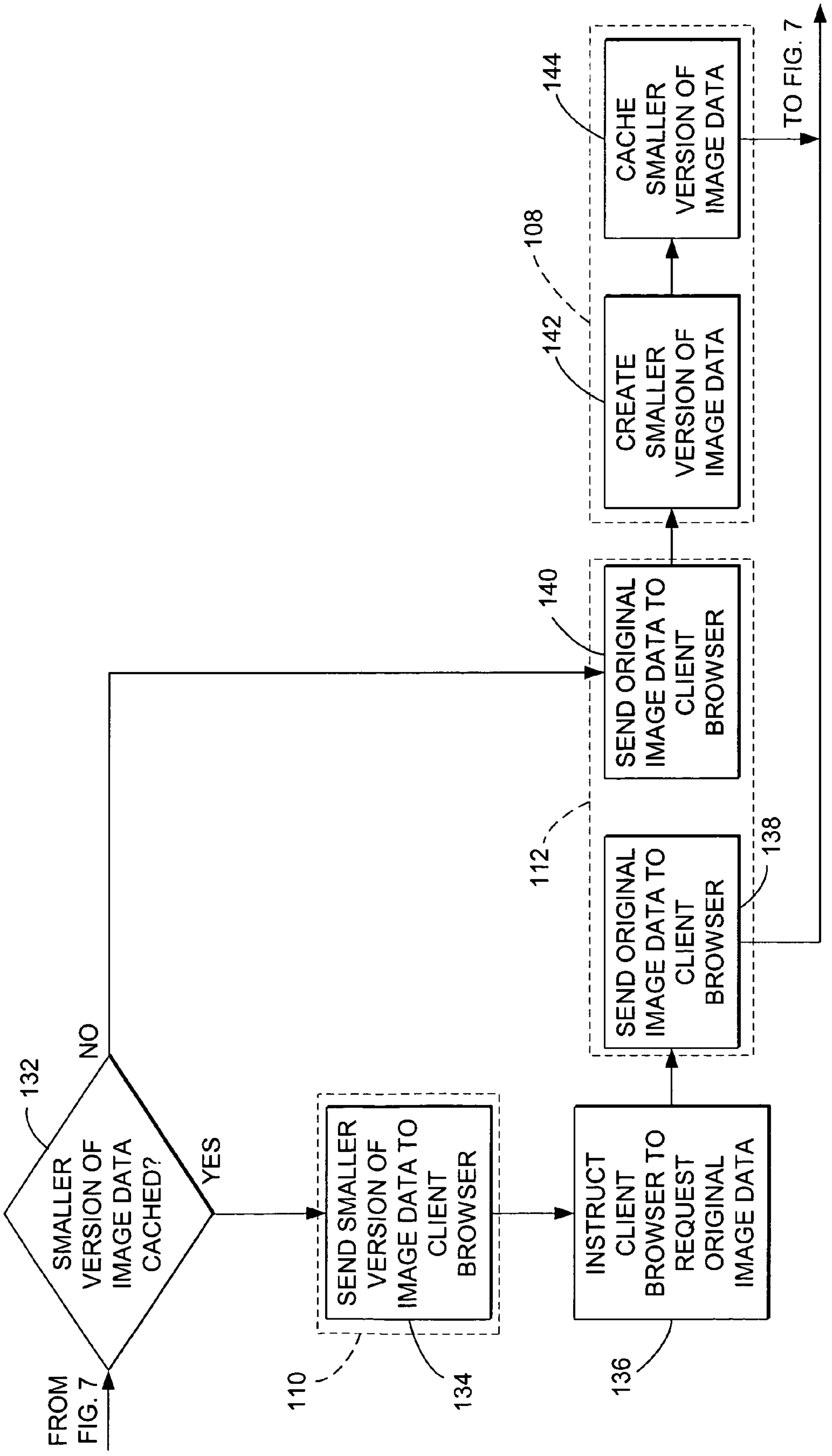
FIG. 8 is a continuation of the flowchart of FIG. 7.

Turning now to FIGS. 7 and 8, method 100 of FIG. 6 is shown in greater detail. Method 100 typically includes listening at 102, receiving a request for web resource 30 at 104, and obtaining requested web resource 30 at 106, as described above. At 105, the method includes determining a hardware configuration of the remote client. The hardware configuration is typically the number of colors supported by display 12*a*, as well as the resolution of display 12*a*. The hardware configuration is typically detected by sending an embedded file in web page source data, the file being configured to instruct the browser to send the hardware configuration to the web server in subsequent communications. The hardware configuration may be used to determine an optimum image data format for image data sent to remote client 12, as described below.

The step of processing web resource 30 is shown in detail at 108 in FIG. 7-11. Processing web resource 108 typically includes, at 114, determining a remote client browser type and/or browser-interpretable file type. Typically, the remote client browser is either the Netscape browser, or the Internet Explorer browser, discussed above, or a browser compatible with one of these two browsers. Of course, it will be appreciated that other browser types may also be detected. The remote client browser type will be used to determine a compression algorithm for compressing data at steps 124 and 128. Browser-interpretable file types are typically sent in a request header from the remote client 12, and may include file types such as GZIP, DEFLATE, WAVELET compression and other file formats.

Processing web resource 108 also typically includes, at 116, determining a content type of web resource 30. Typically, the web resource is either web page source data 32, such as an HTML file, or image data 33. The method typically determines the content type of the web resource by examining the file extension, such as .html, .jpg, .gif, etc.

At 118, if the content type of web resource 30 shows that web resource 30 is image data 33, then method 100 proceeds to step 132 of FIG. 8. At 120, if the content type of web resource 30 shows that the web resource is web page source data 32, then method 100 proceeds to step 122.

At 122, processing 108 further includes filtering web page source data 32, thereby creating modified web page source data 32*a*, smaller in size than original web page source data 32. Modified web page source data 32*a* is also referred to herein as filtered web page source data 32*a*. Typically, the method includes filtering the web page source data 32 in real-time, after the request is received and before the filtered web page source data is sent to remote client 12.

Typically, filtering the web page source data is accomplished by filtering at least a portion of non-renderable data 38 from web page source data 32. In one embodiment of the invention, all of non-renderable data 38 is filtered from the web page source data 32. Alternatively, only a portion of the non-renderable data is filtered from the web page source data.

Figure 9:
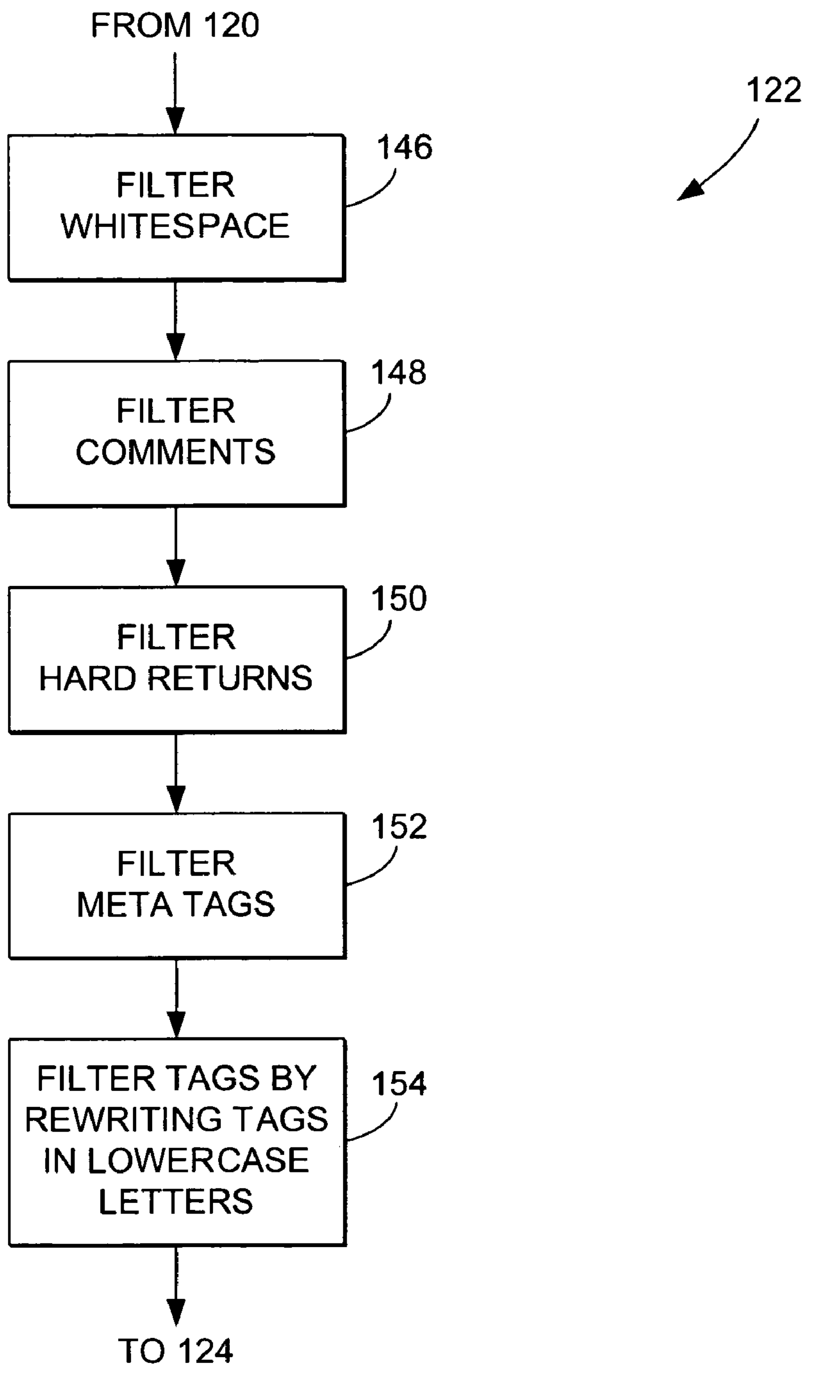
FIG. 9 is a flowchart of one embodiment of a method for accomplishing the step of filtering web page source data, shown in FIG. 7.

Typically, the non-renderable data is filtered according to a process shown in FIG. 9. At 146, the step of filtering 122 typically includes a substep of filtering whitespace from the web page source data. As used herein, the term whitespace refers to space, tab, and other characters in the web page source data 32 that will not be rendered in web page 40, shown at 38*b* and 38*c* in FIG. 17.

At 148, the step of filtering 122 typically includes a substep of filtering comments from the web page source data 32. Comments appear in web page source data 32 in the form shown at 38*h* in FIG. 17.

At 150, the step of filtering 122 typically includes a substep of filtering hard returns, shown at 38*a* in FIG. 17, out of web page source data 32. In HTML, a return or paragraph tag is used to instruct browser 34 to make a hard return in a file. However, in ASCII a return is accomplished either by a carriage return character (CR) and/or a line feed character (LF). Typically, CR and LF ASCII characters are not rendered by browser 34. Therefore, either or both of these characters may be filtered out of web page source data 32. In one embodiment of the invention, the method includes filtering out only the second of two consecutive CRLF character combinations. Thus, where CRLF CRLF appears in the web page source data 32, the second CRLF is filtered out and the first is left intact in the modified web page source data 32*a*. Due to formatting differences between browser types, the method may also include deleting hard returns in a manner based on browser type detected at step 114.

At 152, the step of filtering 122 typically includes a substep of filtering meta tags, shown at 38*d* in FIG. 17. Meta tags 38*d* are tags that contain keywords 38*g* used by Internet search engines to categorize and index web page 40. These meta tags 38*d* and the keywords 38*g* contained therein are not rendered by browser 34, and are thus typically filtered out of web page source data 32. Author and other data in meta tags 38*d* may also be filtered out.

At 154, the step of filtering 122 includes filtering tags by rewriting tags in lowercase letters. Rewriting the tags in lowercase letters tends to reduce the size of the image data after compression by a method such as GZIP or DEFLATE. Thus, rewriting tags in lowercase letters results in a filtered web page source data 32*a* with a smaller file size than original web page source data 32.

Additionally, filtering the web page source file at 122 may include filtering renderable data in a loss-less manner. For example, the method may include filtering a portion of the renderable data from the web page source data, and replacing the portion of the renderable data with substitute renderable data smaller in size and renderably equivalent to the replaced renderable data. Renderably equivalent data is data that is interpreted by browser 34 in a visually, aurally, and interactively identical manner. One example of substituting renderably equivalent data is substituting a set of formatting instructions with an equivalent stylesheet. Thus, the present may include substituting a stylesheet for a set of formatting instructions in web page source data 32.

Returning to FIG. 7, once filtered web page source data 32*a* is produced, method 100 returns to step 124, at which point filtered web page source data 32*a* is compressed in real-time at the acceleration device. If the detected browser type from step 114 is Internet Explorer, filtered web page source data 32*a* is typically compressed using the GZIP compression algorithm. If the detected browser type from step 114 is Netscape, the filtered web page source data 32*a* is typically compressed using the DEFLATE compression algorithm. Alternatively, the method may include detecting whether GZIP, DELFATE, or other compression algorithm is a browser-interpretable file type at 114.

At 126, the method further includes sending the compressed, filtered web page source data 32*a* from acceleration device 18 to remote client 12 for display via browser 34. The method may also include, either automatically or in response to a request from the user, sending the original web page source data 32 to the remote client browser after sending compressed, filtered web page source data 32*a* to the browser.

If at 120, it is determined that web resource 30 is not web page source data 32, then method 100 typically includes compressing web resource 30 in an original, unmodified state, in real-time, using a compression algorithm selected based on browser type or browser-interpretable file format, as described above. At 130, the method further includes sending compressed, original web resource 30 to remote client 12 via computer network 16.

If at 118 it is determined that web resource 30 is image data 33, then method 100 typically includes, at 132, determining whether a smaller version of image data 33*a* is cached on cache 62. If a smaller version of the image data 33*a* is already stored on cache 62, the method includes retrieving the smaller version 33*a* from cache 62 and, at 134, sending smaller version 33*a* of the image data to remote client 12 for display via browser 34 as smaller image 46*a* on web page 40. Step 134 is one exemplary way of accomplishing step 110 of FIG. 6.

At 136, the method typically includes instructing browser 34 to request original image data 33. Typically, this is accomplished by rewriting or replacing a hyperlink in web page source data 32. The hyperlink is shown before rewriting at 36*k* in FIG. 18, and after rewriting at 36*m* in FIG. 19. Before rewriting, hyperlink 36*k* points to the smaller version 33*a* of the image data, and, after rewriting, hyperlink 36*m* points to original image data 33. Rewriting the hyperlink prompts browser 34 to request the original version of image data 33.

In response to this request, the method includes, at 138, sending an original, unmodified version of image data 33 to remote client 12. Browser 34 on remote client 12 displays the original image data as original, unmodified image 46 on web page 40*a*. Step 138, and step 140 described below, are two illustrative ways of accomplishing step 112 in FIG. 6. From step 138, the method typically returns to listening for new requests for web resources at step 102 in FIG. 7.

If at step 132, it is determined that a smaller version 33*a* of the image data is not cached, then method 100 typically includes, at 140, sending original image data 33 to browser 34 on remote client 12. Browser 34 displays original image data 33 as image 46 on the web page. Thus, the first time that acceleration device 18 encounters a request for a particular image data 33, the image is typically sent to the requesting remote client without first sending a smaller version 33*a* of the image data. This is because, according to one preferred embodiment of the invention, image processing is not performed in real-time, in order to decrease latency in serving the requested image data to remote client 12.

Alternatively, according to another preferred embodiment of the invention, image data 33 may be processed in real-time by DSP 66 of acceleration device 18. According to this embodiment of the invention, a smaller version 33*a* of the image data is created in real-time and sent to remote client 12, followed shortly thereafter by the original image data 33.

After the original image is sent at 140, the method further includes, at 142, creating a smaller version 33*a* of original image data 33 and, at 144, caching the smaller version 33*a* on cache 62. After caching the smaller version 33*a*, the method subsequently returns to listening for new requests for web resource at 102 in FIG. 7.

Figure 10:
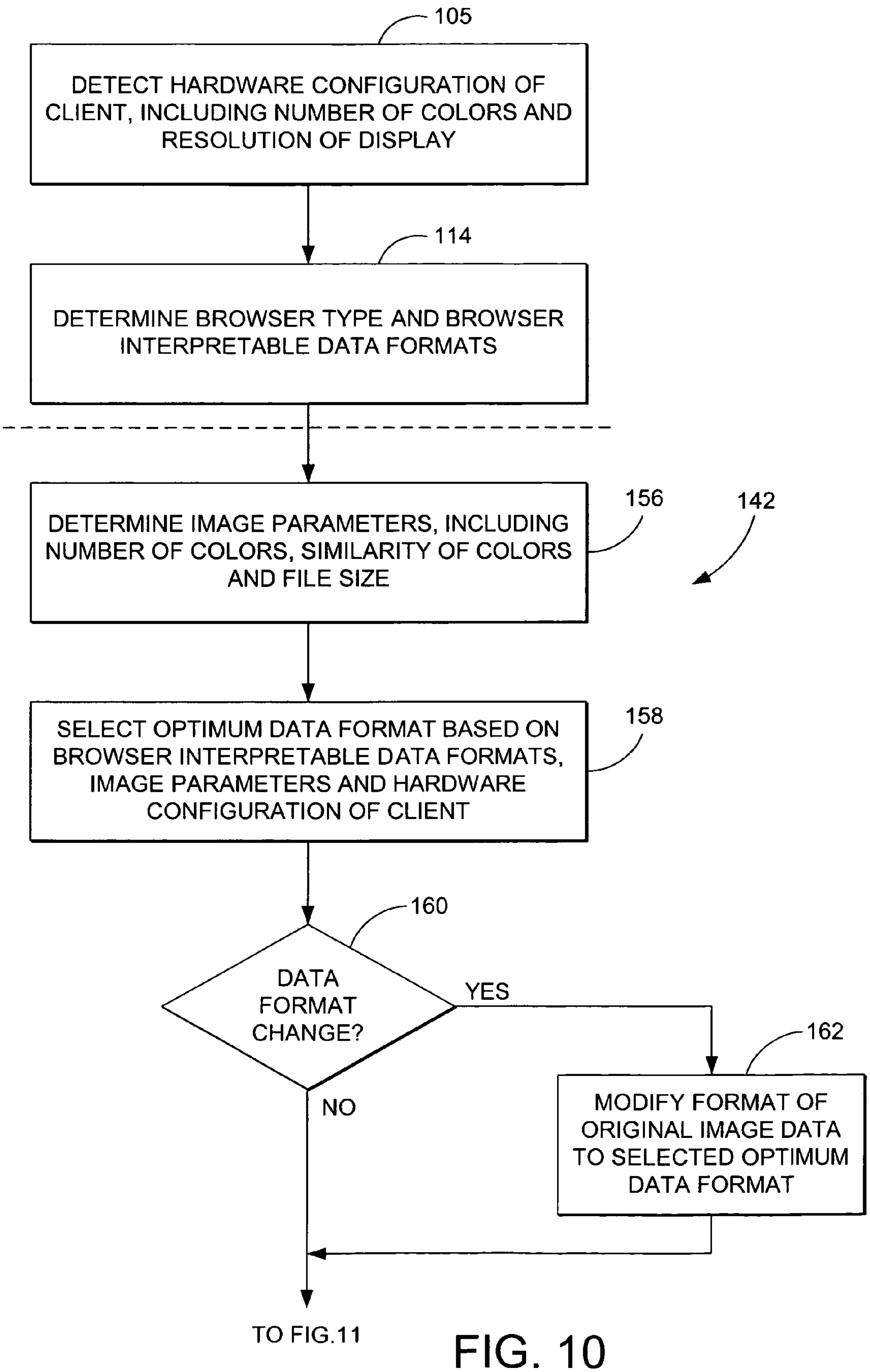
FIG. 10 is a flowchart of one embodiment of a method for accomplishing the step of creating a smaller version of the image data, shown in FIG. 8.

As shown in FIG. 10, the step of creating the smaller version 33*a* of the image data is typically accomplished by, at 156, determining one or more image parameters. The image parameters may include number of colors, similarity of colors, file size, resolution, or other image parameters. At 158, the method typically includes selecting an optimum data format for the image data based on browser interpretable data format(s) determined at 114, a hardware configuration of remote client 12, determined at 105, and the image parameter(s) determined at 156. For example, if the user's display 12*a* is configured to display only 256 colors, and the original image data 33 includes millions of colors, the present method is configured to convert the file format of the image data to a 256 color file format and send the 256 color image to the remote client as smaller version 33*a*. By way of this example, it will be understood that the smaller version 33*a* of the image file may be generated by means of loss-less compression. That is, smaller image 46*a* may appear identical to original image 46 to the user of remote client 12, because the user's hardware configuration is not configured to fully display the colors or resolution of the original image 46.

At 160, the method further includes determining if the image data is already stored in the optimum file format. If so, the method proceeds to FIG. 11. If not, the method further includes, at 162, modifying the format of the original image data to he optimum data format. Thus, acceleration device 18 is configured to receive image data in one format such as JPEG, for example, and convert the image data into another optimum format, such as GIF, before sending the image to the requesting remote client 12. This conversion may be performed in real time by a DSP, or may be performed "off line" by caching an image file in the optimum format for future requests and sending the image file in an unmodified format to the current requesting remote client 12.

Figure 11:
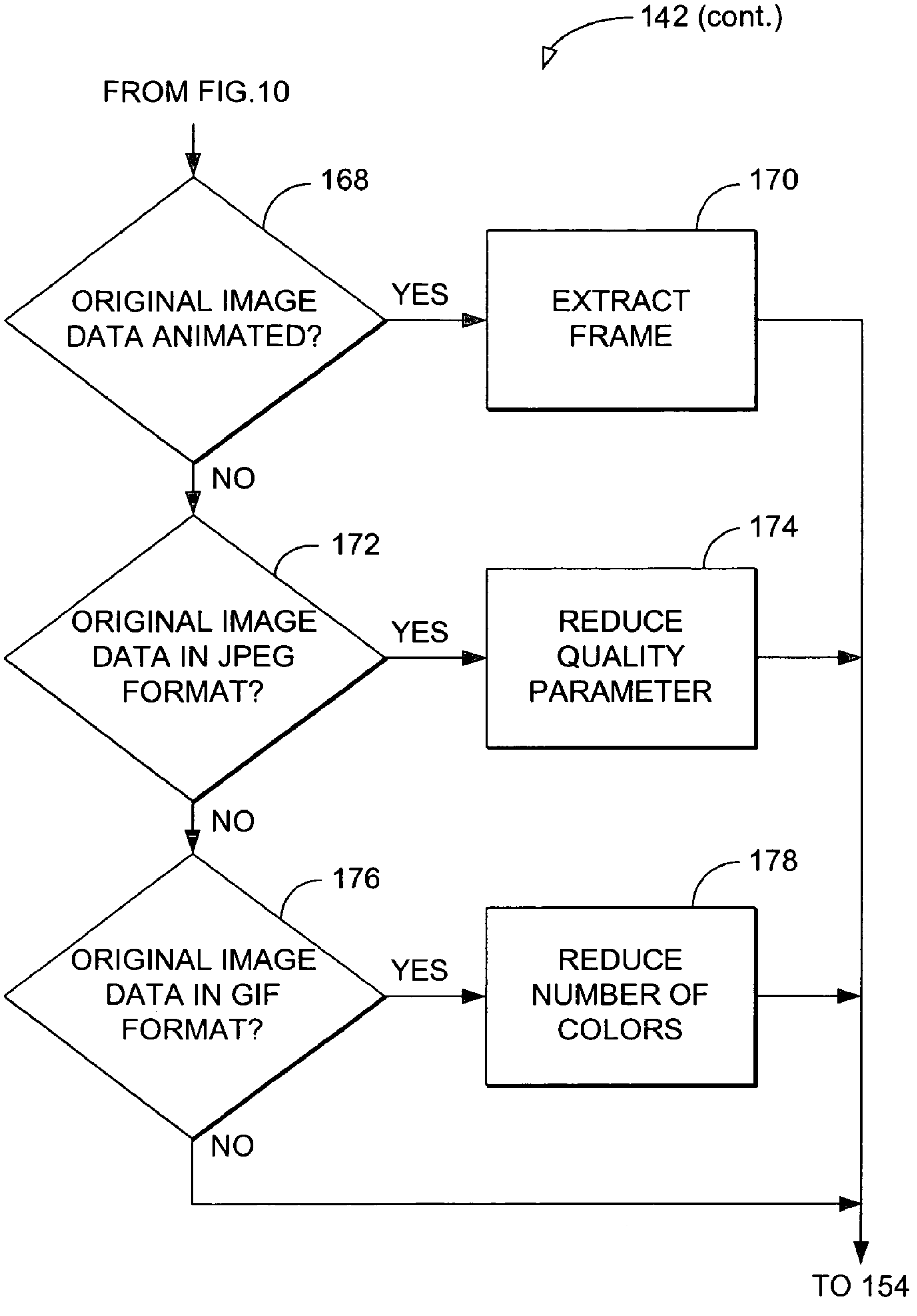
FIG. 11 is a continuation of the flowchart of FIG. 10.

As shown in FIG. 11, step 142 of creating the smaller version 33*a* of the image data is typically further accomplished by, at 168, determining whether original image data 33 is animated (such as an animated GIF file), and if so, extracting a frame of the image data at 170. Typically, the first frame is extracted, although virtually any suitable frame may be extracted. The first frame is then cached as smaller version 33*a* of the image data. The first frame may further be reduced in size by reducing the number of colors or reducing a quality parameter associated with the first frame, as described below.

At 172, the method further includes determining whether original image data 33 is in a JPEG format. If so, the method further includes, at 174, reducing a quality parameter associated with JPEG image data 33. This reduces the overall file size of JPEG image data 33. The resultant image data is cached as smaller version 33*a* of image data 33.

At 176, the method further includes determining whether original image data 33 is in a GIF format. If so, the method further includes, at 178, reducing the number of colors in the GIF image data. This reduces the overall file size of GIF image data 33. The resultant image data is cached as smaller version 33*a* of image data 33.

Figure 12:
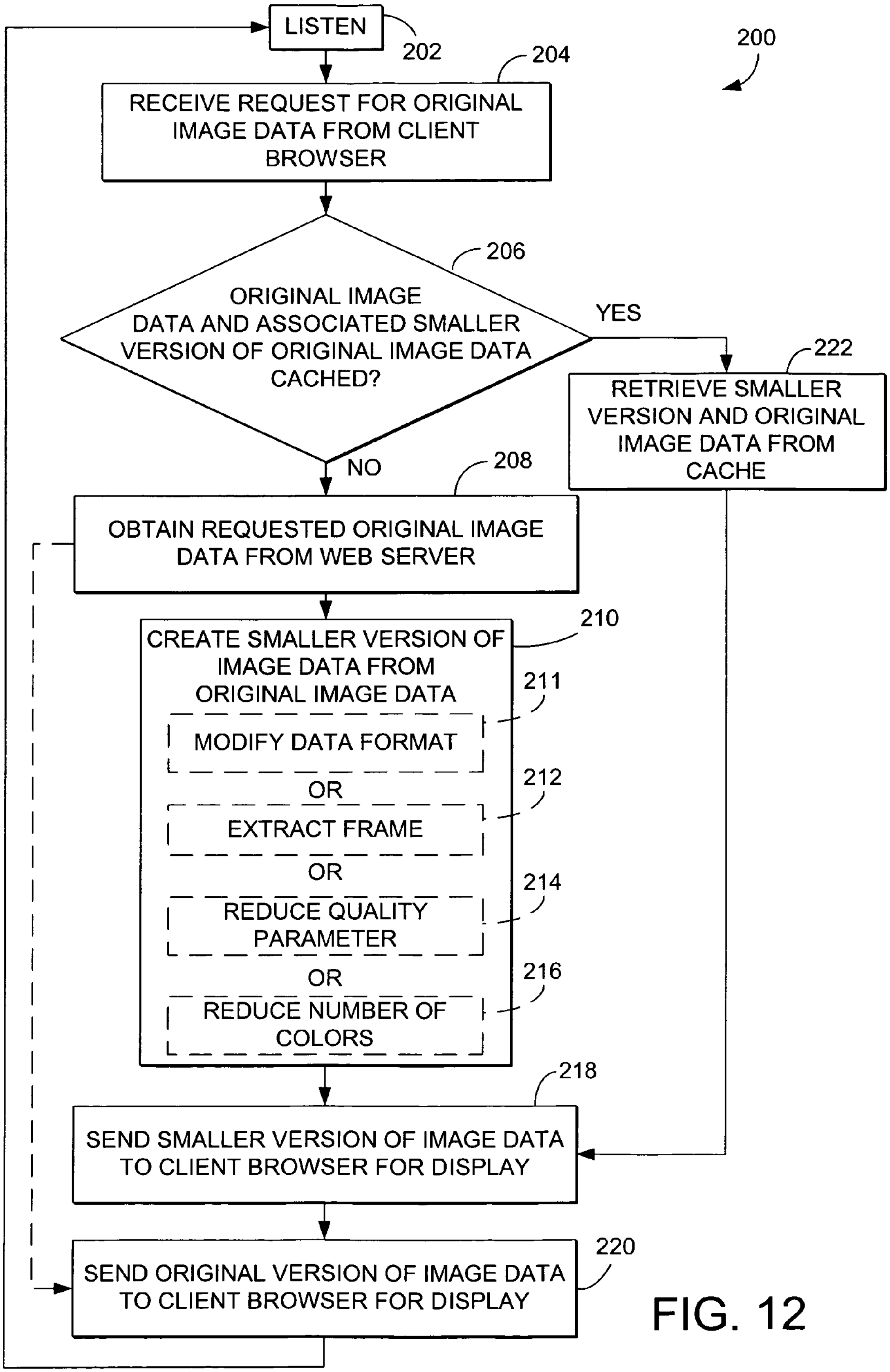
FIG. 12 is a flowchart of a method for transferring image data over a computer network, according to one embodiment of the present invention.

Turning now to FIG. 12, a method for transmitting image data according to another embodiment of the present invention is shown generally at 200. Method 200 typically includes, at 202, listening for a request from a remote client 12 for web resource 30. Listening at 202, as well as all other steps in methods 200, is typically performed by acceleration device 18, described above. At 204, the method typically includes receiving a request for original image data 33 from a browser 34 on remote client 12.

At 206, the method typically includes, determining whether original image data 33 and an associated smaller version 33*a* are cached on cache 62. If not, the method proceeds to 208, where the method includes obtaining requested original image data 33 from web server 14.

At 210, the method further includes creating a smaller version 33*a* of image data 33. Typically, this is accomplished by, at 211, modifying the image data to an optimum format, at 212, extracting a frame of animated image data, at 214, reducing a quality parameter associated with image data, and/or at 216, or reducing the number of colors associated with the image data. These steps are described in detail above.

At 218, the method typically includes, sending smaller version 33*a* of image data 33 to browser 34 of remote client 12 for display as smaller image 46*a* on a web page 40. The method may also include instructing browser 34 to request original version of image data 33, typically by rewriting a hyperlink, as described above. At 220, the method typically includes sending original version of image data 33 to browser 34 for display as original image 46 in web page 40*a*.

Alternatively, method 200 may proceed directly from obtaining the original image from web server 14 at 208, to sending the original image to remote client 12 at 220, thereby reducing latent processing time at acceleration device 18. In this embodiment, the method typically includes creating a smaller version 33*a* according to step 218 and caching the smaller version 33*a* on cache 62 after an original image 33 is sent to remote client 12 at 220. The method subsequently returns to listening at 202.

If, at 206, it is determined that original image 33 and associated smaller version 33*a* of the image previously created according to step 210, is cached, then the method typically further includes retrieving the original and smaller versions 33, 33*a* from the cache at step 222, and sending the original and smaller versions 33, 33*a* to the remote client 12 at steps 218, 220. The method subsequently returns to listening at 202.

Figure 13:
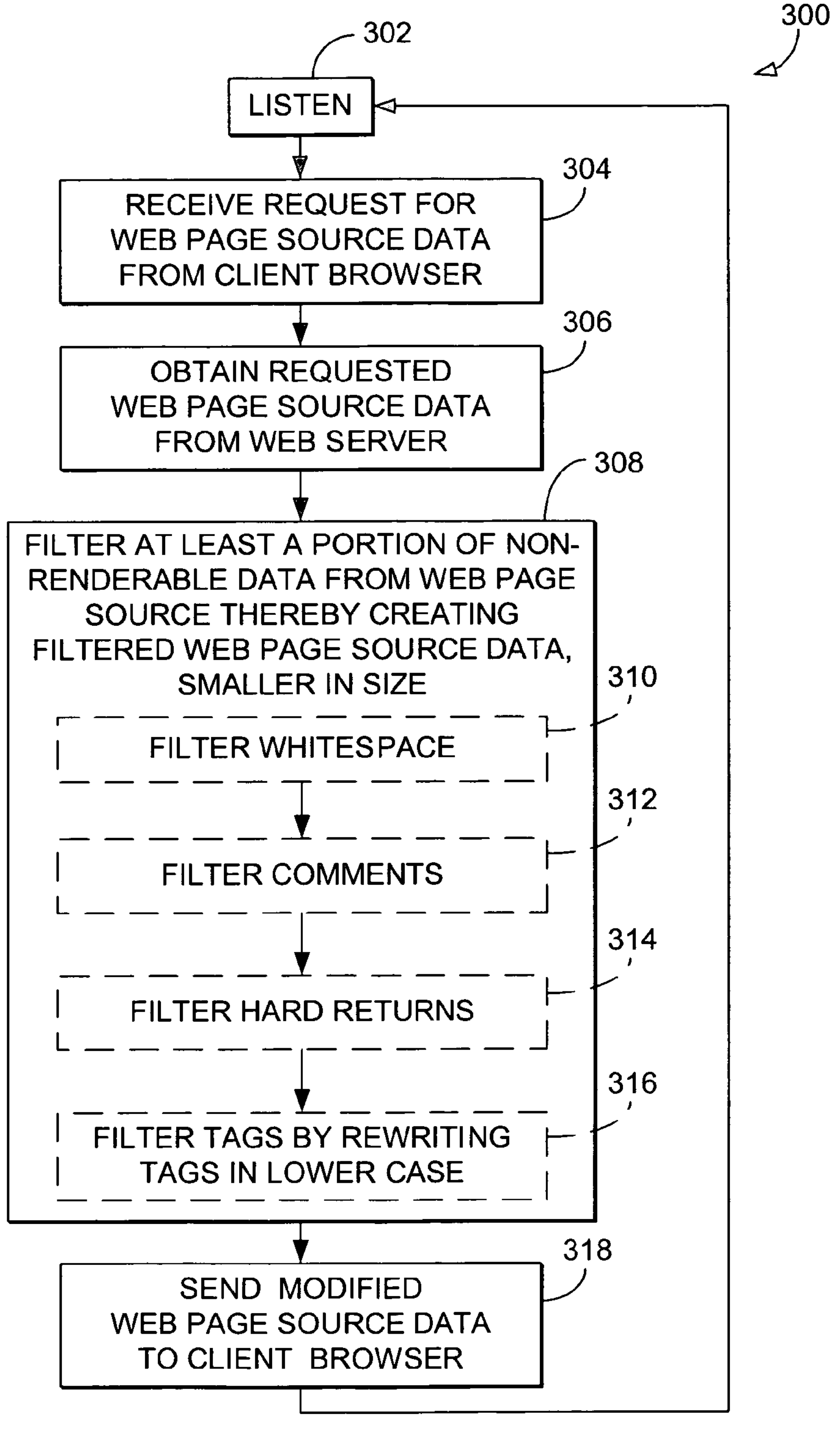
FIG. 13 is a flowchart of a method for transferring web page source data over a computer network, according to one embodiment of the present invention.

Turning now to FIG. 13, a method for transmitting web page source data according to another embodiment of the invention is shown generally at 300. Method 300 typically includes, at 302, listening for a request for web page source data 32 from a remote client 12. The step of listening, as well as all other steps of method 300, are typically performed by acceleration device 18, described above.

At 304, the method typically includes receiving a request for web page source data 32, such as an HTML file, from a browser 34 on remote client 12. At 306, the method further includes obtaining requested web page source data 32 from an associated web server 14. The web page source data may also be obtained from cache 62 if it is static web page source data stored thereon.

Typically, web page source data 32 includes renderable data 36 and non-renderable data 38, as described above. At 308, the method typically includes filtering at least a portion of non-renderable data 38 from the web page source data, thereby creating a modified and filtered version 32*a* of the original web page source data. Modified web page source data 32*a* is smaller in file size than original web page source data 32.

Typically, filtering at 308 is accomplished by one or more of filtering substeps 310-316. At 310, the method may include filtering whitespace from web page source data 32, as described above. At 312, the method may include filtering comments from the web page source data, as described above. At 314, the method may include filtering hard returns from the web page source data, as described above. At 316, the method may include filtering tags from the web page source data by rewriting the tags in lowercase, as described above. In addition, the method may include filtering non-renderable commands such as HTML tags that browser 34 cannot interpret.

At 318, the method typically includes sending modified and filtered web page source data 32*a* to browser 34 on remote client 12. The method may also include, before sending the modified web page source data 32*a*, compressing modified web page source data 32*a*. The compression algorithm used to compress the modified web page source data may be selected based on a detected browser type and/or browser-interpretable data format, as described above.

Browser 34 is configured to display modified web page source data 32*a* as web page 40. The visual and aural presentation of modified web page source data 32*a* via browser 34 is typically identical to the visual and aural presentation of original web page source data 32 via browser 34. That is, the two files 32, 32*a* look, sound, and interact in the same manner for a user of browser 34.

Turning now to FIG. 17, an example of original web page source data is shown generally at 32. Typically, web page source data 32 is in the HTML format, and may be a static file or may be dynamically generated. Web page source data 32 typically includes renderable data 36 and non-renderable data 38, as described above. Renderable data 36 typically includes HTML tags relating to language and formatting, such as HTML tag 36*a*, HEAD tag 36*b*, TITLE tag 36*c*, BODY tag 36*d*, CENTER tag 36*e*, anchor (A) tag 36*f*, image (IMG) tags 36*g*, 36*i*, and heading (H1) tag 36*h*. Renderable data 36 also includes text data 36*j*, and linked image data. Image tag 36*i* is a hyperlink to an original version of the image data 33.

Non-renderable data 38 typically includes hard returns 38*a* and whitespace such as tabs 38*b* and spaces 38*c*. Non-renderable data further includes meta tags 36*d*, which contain parameters such as the author parameter 36*e*, and the content parameter 36*f*. The content parameter 36*f* typically contains keywords 36*g*, which are used by search engines to catalog and index the web page. Non-renderable data 36 further includes comments 36*h*. Any and/or all of non-renderable data 36 may be filtered out of web page source data 32 according to the embodiments of the present invention.

FIG. 18 shows filtered web page source data 32*a*, with a hyperlink 36*k* to smaller version 33*a* of image data 33. Whitespace, hard returns, meta tags (including author, and content-related keywords) and comments have been removed. Browser 34 interprets web page source data 32*a* to display web page 40 (having smaller image 46*a*) on remote client 12. Because web page source data 32*a* has the non-renderable data filtered from it, and because it contains a hyperlink to a smaller image file 33*a*, it requires less time to download than web page source data 32. Thus, the user may view web page 40 more quickly using the herein described data transmission methods than using conventional methods.

FIG. 19 shows filtered web page source data 32*a*', with a hyperlink 36*m* to original image data 33. Typically, embedded code (typically an applet) is inserted into the web page source data 32 to cause the browser 34 to rewrite the filtered web page source data 32*a* to the form shown at 32*a*', as described above. Browser 34 interprets web page source data 32*a*' to display web page 40*a* on remote client 12. Thus, while having the benefit of being able to download web page 40 quickly, the user is eventually able to view an original version 46 of image data 33.

The above described invention may be used to accelerate data transmission over a computer network, in order to decrease delay and provide users with a more pleasurable experience.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A method for transferring web page source data between a web server and a remote client over a computer network, the computer network including a wide area network, the method comprising:

receiving a request for the web page source data from the remote client at a server-side acceleration device positioned on the computer network intermediate the remote client and the web server and intermediate the web server and the wide area network obtaining original web page source data from the web server;

identifying within the original web page source data renderable character data and non-renderable character data, the renderable character data being data that affects the presentation of the web page by a browser, and the non-renderable character data being data that does not affect the presentation of the web page by a browser, the original web page source data being in a markup language data format;

filtering at least a portion of the non-renderable character data by removing characters of the identified non-renderable character data from the original web page source data, thereby creating modified web page source data;

transmitting the modified web page source data to the remote client over the computer network; and after transmitting the modified web page source data to the remote client, transmitting the original web page source data to the remote client including the characters that were removed.

2. The method of claim 1, further comprising:

identifying tags of the web page source data having one or more uppercase characters; and rewriting the identified tags of the web page source data to have the same characters but in a lowercase.

3. The method of claim 1, wherein the original web page source data is sent to the remote client in response to a subsequent request from the remote client for the original web page source data.

4. The method of claim 1, further comprising, compressing the modified web page source data before sending it to the remote client.

5. The method of claim 1, wherein the web server and acceleration device are connected by a LAN.

6. The method of claim 1, wherein the acceleration device and remote client are connected by a WAN.

7. The method of claim 6, wherein the WAN is the Internet.

8. The method of claim 1, wherein filtering at least a portion of the non-renderable character data from the original web page source data comprises removing character data compatible with the HTTP data transfer protocol from the original web page source data.

9. The method of claim 8, wherein filtering at least a portion of the non-renderable character data from the original web page source data comprises removing HTML data from the original web page source data.

10. The method of claim 9, wherein filtering at least a portion of the non-renderable character data from the original web page source data comprises removing data in the ASCII format from the original web page source data.

11. The method of claim 9, wherein filtering at least a portion of the non-renderable character data from the original web page source data comprises removing whitespace from the original web page source data.

12. The method of claim 9, wherein filtering at least a portion of the non-renderable character data from the original web page source data comprises removing comments from the original web page source data.

13. The method of claim 9, wherein filtering at least a portion of the non-renderable character data from the original web page source data comprises removing meta tags from the original web page source data.

14. The method of claim 9, wherein filtering at least a portion of the non-renderable character data from the original web page source data comprises removing keywords configured to be interpreted by a search engine from the original web page source data.

15. The method of claim 9, wherein filtering at least a portion of the non-renderable character data from the original web page source data comprises removing commands not interpretable by the remote client from the original web page source data.

16. The method of claim 1, wherein the filtering and transmitting of the modified web page source data over the computer network to the remote client are performed in less time than the original web page source data can be directly transmitted from the web server to the remote client.

17. The method of claim 1, wherein the file size of the modified web page source data is smaller than the original web page source data.

18. A server-side networking device for use on a computer network having a web server and a remote client, wherein the remote client is configured to download a web resource from the web server via the computer network, the computer network including a wide area network, the networking device comprising:

a controller configured to be connected on the computer network intermediate the web server and the wide area network, and to obtain original web page source data from the web server, the original web page source data containing renderable character data and non-renderable character data, the renderable character data being data that affects the presentation of the web page by a browser, and the non-renderable character data being data that does not affect the presentation of the web page by a browser, the original web page source data being in a markup language data format, wherein the controller is further configured to filter at least a portion of the non-renderable character data by removing one or more characters from the original web page source data, thereby creating modified web page source data, transmit the modified web page source data to the remote client over the computer network, and, after transmitting the modified web page source data to the remote client, transmit the original web page source data to the remote client including the characters that were removed.

19. The networking device of claim 18, wherein the controller includes a network communications program logic stored on an ASIC.

20. The networking device of claim 18, wherein the controller includes a CPU coupled to a memory, and a network communications program stored in memory and executable by the CPU.

21. The networking device of claim 18, wherein the controller is configured to remove character data compatible with the HTTP data transfer protocol from the original web page source data.

22. The networking device of claim 21, wherein the controller is configure to remove HTML data from the original web page source data.

23. The networking device of claim 22, wherein the controller is configured to remove data in the ASCII format from the original web page source data.

24. The networking device of claim 22, wherein the controller is configured to remove whitespace from the original web page source data.

25. The networking device of claim 22, wherein the controller is configured to remove comments from the original web page source data.

26. The networking device of claim 22, wherein the controller is configured to remove meta tags from the original web page source data.

27. The networking device of claim 22, wherein the controller is configured to remove keywords configured to be interpreted by a search engine from the original web page source data.

28. The networking device of claim 22, wherein the controller is configured to remove commands not interpretable by a browser executed on the remote client from the original web page source data.

29. The networking device of claim 18, wherein the controller is configured to filter and transmit the modified web page source data over the computer network to the remote client in less time than the original web page source data can be directly transmitted from the web server to the remote client over the computer network.

30. The networking device of claim 18, wherein the file size of the modified web page source data is smaller than the original web page source data.

31. A system for use in transferring web page source data over a computer network, the computer network including a wide area network, the system comprising:

a web server configured to serve original web page source data over a computer network, the original web page source data containing renderable data and non-renderable data, the renderable data being data that affects the presentation of the web page by a browser, and the non-renderable data being data that does not affect the presentation of the web page by a browser, the original web page source data being in a markup language data format;

a remote client configured to send a request for the original web page source data to the web server; and a server-side acceleration device positioned intermediate the web server and the remote client on the computer network and intermediate the web server and the wide area network, the acceleration device configured to receive the request for the original web page source data from the remote client, to obtain the original web page source data from the web server, to filter at least a portion of the non-renderable data by removing one or more characters from the original web page source data, thereby creating modified web page source data, smaller in size than the original web page source data, and to send the modified web page source data to the remote client;

wherein the remote client is configured to display the modified web page source data, and wherein the acceleration device is configured to send to the remote client an original, unmodified version of the web page source data including the characters that were removed after sending the modified web page source data to the remote client.

32. The system of claim 31, wherein the removed characters include whitespace.

33. The system of claim 31, wherein the removed characters include comments.

34. The system of claim 31, wherein the removed characters include hard returns.

35. The system of claim 31, wherein the removed characters include meta tags.

36. The system of claim 31, wherein the removed characters include keywords configured to be interpreted by a search engine.

37. The system of claim 31, wherein the acceleration device is configured to identify tags of the web page source data having one or more uppercase letters and rewrite the identified tags of the web page source data to have the same letters but in lowercase.

38. The system of claim 31, wherein the acceleration device is configured to cache the modified web page source data.

39. The system of claim 31, wherein the acceleration device is configured to compress the web resources in real-time after removing the characters and before transmission to the remote client.

* * * * *